(12) United States Patent
Upton (10) Patent No.: US 9,550,250 B2
(45) Date of Patent: Jan. 24, 2017

(54) TORCH-MOUNTED FINGERTIP WELDING CONTROLLER

(71) Applicant: Howard T. Upton, Hillsborough, NC (US)

(72) Inventor: Howard T. Upton, Hillsborough, NC (US)

(73) Assignee: Howard T. Upton, Hillsborough, NC (US)

( * ) Notice: Subject to any disclaimer, the term of this patent is extended or adjusted under 35 U.S.C. 154(b) by 467 days.

(21) Appl. No.: 14/088,826

(22) Filed: Nov. 25, 2013

(65) Prior Publication Data

US 2014/0144898 A1 May 29, 2014

Related U.S. Application Data

(60) Provisional application No. 61/729,655, filed on Nov. 26, 2012.

(51) Int. Cl.
| | | |
|---|---|---|
| *B23K 9/10* | (2006.01) | |
| *B23K 9/167* | (2006.01) | |
| *B23K 9/29* | (2006.01) | |
| *B23K 9/32* | (2006.01) | |

(52) U.S. Cl.
CPC ........... *B23K 9/1087* (2013.01); *B23K 9/1043* (2013.01); *B23K 9/167* (2013.01); *B23K 9/296* (2013.01); *B23K 9/32* (2013.01)

(58) Field of Classification Search
CPC ..... B23K 9/1043; B23K 9/1087; B23K 9/167; B23K 9/296; B23K 9/32
See application file for complete search history.

(56) References Cited

U.S. PATENT DOCUMENTS

| | | | | |
|---|---|---|---|---|
| 2,634,355 A | * | 4/1953 | Girard | B23K 9/0673 219/130.4 |
| 2,702,333 A | * | 2/1955 | Anderson | B23K 9/007 219/124.02 |
| 3,248,516 A | * | 4/1966 | Gilliland | B23K 9/1336 219/137.42 |
| 3,305,664 A | * | 2/1967 | Kensrue | B23K 9/1087 219/137.41 |
| 3,968,341 A | * | 7/1976 | Manning | B23K 9/1087 219/132 |
| 4,051,344 A | * | 9/1977 | Robbins | B23K 9/1087 219/130.1 |
| 4,216,367 A | * | 8/1980 | Risberg | B23K 9/1087 219/132 |
| 4,227,066 A | * | 10/1980 | Bulwidas, Jr. | B23K 9/1087 219/132 |
| 4,510,373 A | * | 4/1985 | Cox | B23K 9/1087 219/130.31 |

(Continued)

*Primary Examiner* — David Angwin
*Assistant Examiner* — Frederick Calvetti
(74) *Attorney, Agent, or Firm* — Coats & Bennett, PLLC (57) ABSTRACT

A torch-mounted power controller mounts to the handle of a welding torch and includes a control lever that is operated by the user's finger. The control lever is arranged to allow the user to hold the torch with a normal grip. Power supply to the welding torch is controlled by applying finger pressure to a control lever. A voltage control circuit is operatively connected to the control lever and controls the amount of power supplied responsive to the movement of the control lever.

7 Claims, 7 Drawing Sheets

(56) References Cited

U.S. PATENT DOCUMENTS

| | | | | |
|---|---|---|---|---|
| 4,608,482 A * | 8/1986 | Cox | ............ | B23K 9/1087 |
| | | | | 219/130.31 |
| 4,658,112 A * | 4/1987 | Thompson | ............ | B23K 9/127 |
| | | | | 219/124.22 |
| 4,931,018 A * | 6/1990 | Herbst | ............ | G09B 19/24 |
| | | | | 345/10 |
| 4,948,942 A * | 8/1990 | Hiibel | ............ | H01H 9/061 |
| | | | | 219/130.1 |
| 6,051,808 A * | 4/2000 | Kleppen | ............ | B23K 9/282 |
| | | | | 219/132 |
| 6,103,994 A * | 8/2000 | DeCoster | ............ | B23K 9/0953 |
| | | | | 219/130.5 |
| 7,244,909 B2 * | 7/2007 | Kensrue | ............ | B23K 9/28 |
| | | | | 219/137.31 |
| 2005/0023263 A1* | 2/2005 | Blide | ............ | B23K 9/295 |
| | | | | 219/132 |
| 2005/0103768 A1* | 5/2005 | Ward | ............ | B23K 9/10 |
| | | | | 219/132 |
| 2009/0152254 A1* | 6/2009 | Giese | ............ | B23K 9/287 |
| | | | | 219/137.31 |
| 2010/0096436 A1* | 4/2010 | Nangle | ............ | B23K 3/0384 |
| | | | | 228/41 |
| 2011/0062131 A1* | 3/2011 | Binzel | ............ | B23K 9/1087 |
| | | | | 219/136 |
| 2011/0220616 A1* | 9/2011 | Mehn | ............ | B23K 9/291 |
| | | | | 219/74 |

* cited by examiner

TORCH-MOUNTED FINGERTIP WELDING CONTROLLER

CROSS-REFERENCE TO RELATED APPLICATION

This application claims priority to U.S. Provisional Patent Application Ser. No. 61/729,655, filed Nov. 26, 2012, the disclosure of which is incorporated herein by reference in its entirety.

TECHNICAL FIELD

The present disclosure relates generally to TIG welding equipment and, more particularly, to a torch-mounted, fingertip welding controller for a TIG welder.

BACKGROUND

Probably every operator who has ever used a TIG torch has wanted a true fingertip controller for the welding current. The prior art offers numerous examples of torch-mounted controllers that purport to offer such control. Examples of torch-mounted controllers in the prior art are U.S. Pat. No. 6,051,808 to Kleppen, U.S. Pat. No. 4,227,066 to Bulwidas, and U.S. Pub. No. 2005/0023263 A1 to Bilde.

The prior art torch-mounted welding controllers have proved unsatisfactory so that most TIG operators still prefer to use a foot pedal control whenever possible Controllers taught in the prior art have the following problems:

- They require the operator to alter his normal, preferred grip on the torch in order to reach the control with one or more fingers. In some cases, as with trigger type schemes, the grip required will be completely foreign to most operators.
- Once the operator's finger has found the control knob or trigger, activation requires a large range of motion, involving many muscles of the hand; in fact, with many controllers you can't go from off to full power in one smooth motion, but must finger the controller repeatedly.
- Many of these controllers require a fair amount of finger pressure, because they work by friction between the finger and a knob or belt.
- Operation of the controller interferes with the operator's main task, which is maintaining an exact and very close height of the torch and electrode above the weld puddle.

Accordingly, there remains a need for a troch-mounted welding controller that overcomes one or more of these problems.

SUMMARY

The present disclosure relates to a torch-mounted power controller for an electric arc welder. Although intended primarily for tungsten inert-gas (TIG) welding, it could be used in other welding processes such as metal inert-gas (MIG) or plasma welding. The welding controller comprises a control lever that mounts to the handle of a welding torch and is operated by the user's finger. The control lever is arranged to allow the user to hold the torch with a normal grip. In some embodiments, the control lever includes a pivot and extends forwardly from the pivot so as to lie directly beneath the user's finger. Power supply to the welding torch is controlled by applying finger pressure to the control lever. A voltage control circuit is operatively connected to the control lever and controls the amount of power supplied responsive to the movement of the control lever.

In some embodiments, the voltage control circuit comprises a sequentially-switched resistor network including two or more voltage control switches and two or more series connected resistors arranged as a voltage divider. When finger pressure is applied to the control lever, the voltage control switches are sequentially actuated as the control lever is depressed.

In some embodiments, a contactor circuit is provided to activate the power supply for the welding torch. The contactor circuit is configured to activate the power supply when finger pressure is applied to the control lever. In one embodiment, the contactor circuit comprises a contactor switch activated by the control lever when finger pressure is applied to the control lever. The contactor switch may be arranged to be activated prior to activation of one of the voltage control switches, at the same time as a first one of the voltage control switches, or after a first one of the voltage control switches.

The welding controller according to various embodiments described herein provides the user with fingertip control of the welding power supply from off to full power or levels in between. The embodiments herein described further provide a degree of fine control without altering the operator's normal grip on the torch, and without requiring a large range of finger motion or pressure that could disturb the position of the torch electrode relative to the weld puddle.

DETAILED DESCRIPTION

Referring now to the drawings, a welding controller 10 according to exemplary embodiments of the disclosure is shown. Similar reference numbers are used in the Figures to indicate similar elements.

Figure 1:
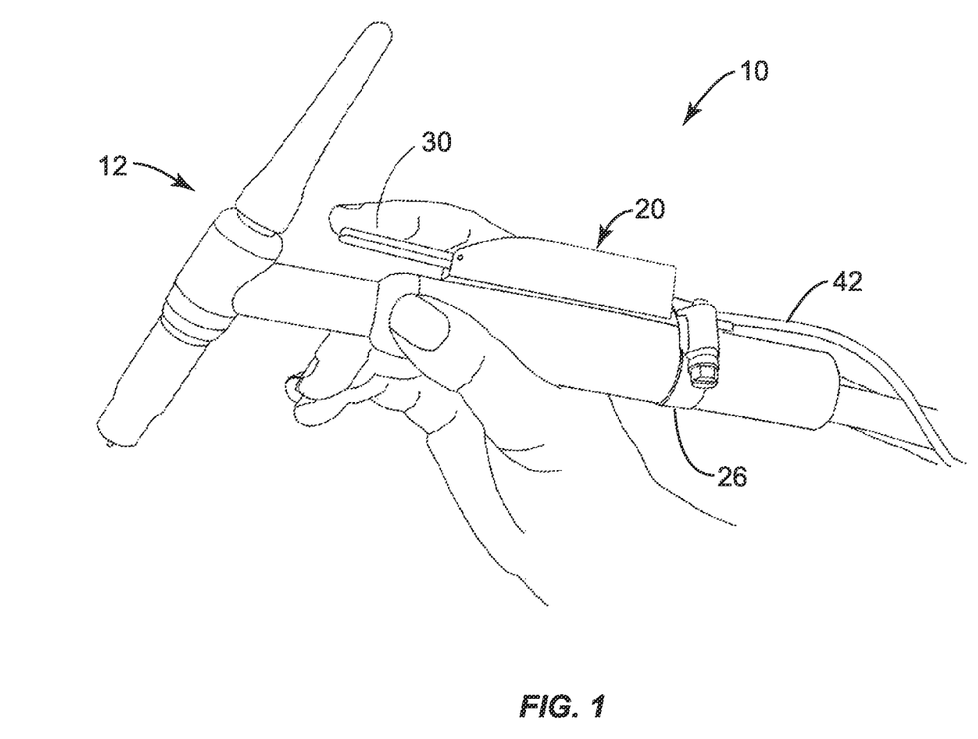
FIG. 1 is a perspective view of a torch-mounted, welding controller according to a first embodiment.

FIG. 1 illustrates a welding controller 10 according to a first embodiment attached to a typical TIG welding torch 12. The welding controller 10 comprises a controller housing 20, a control lever 30 pivotally connected to the housing 20, and a control circuit 40 contained within the housing 20 for controlling the power supplied to the welding torch. The controller housing 20 comprises a base 22 and cover 24 detachably secured to the base 22. The controller housing 20 is attached to the torch handle by a clamp 26, although other methods for securing the housing 20 to the torch handle could be used. The control lever 30 is connected to the housing 20 by a pivot 36. The outer end 32 of the control lever 30 extends forwardly from the housing 20 towards the torch head. The inner end 34 of the control lever 30 extends into the housing 20. The housing 20 is positioned on the torch handle so that the control lever 30 lies directly under the user's finger. This arrangement allows the user to hold the torch 12 with a normal grip. The user can exert a varying downward pressure on the control lever 30 with an index finger or middle finger to control the power supply to the welding torch. As will be described in more detail below, the inner end 34 of control lever 30 activates a series of switches in the control circuit 40 to control the power to the welding torch 12.

Figure 3:
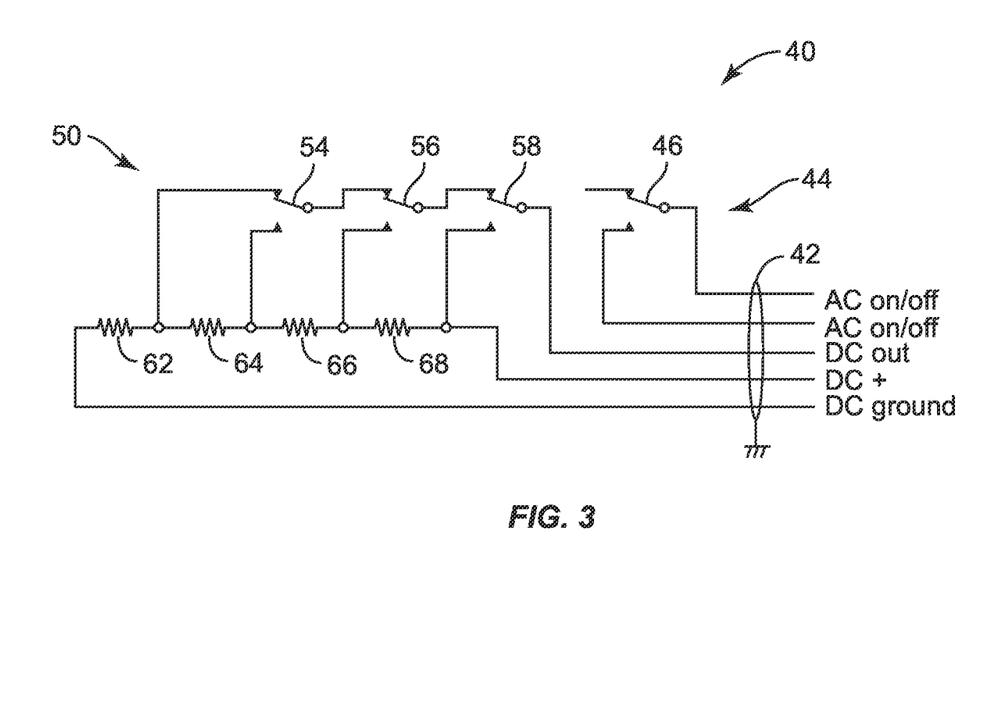
FIG. 3 is a schematic diagram of an exemplary control circuit of the torch-mounted, welding controller according to the first embodiment.

FIG. 3 illustrates an exemplary control circuit 40 which is mounted to circuit board 28 and connected by a cable 42 to the welding power supply. The control circuit 40 comprises a contactor circuit 44 and a voltage control circuit 50. The contactor circuit 44 comprises a contactor switch 46 that completes an AC circuit to activate the welding power supply. The voltage control circuit 50 comprises a plurality of voltage control switches 54, 56, 58 and resistors 62, 64, 66, and 68 arranged as a voltage divider. The resistors 62, 64, 66, and 68 are connected in series between a nominal +10 volt (DC+) input and ground (GND). The voltage control switches 54, 56, 58 are connected between respective pairs of the resistors 62, 64, 66, and 68 and arranged to supply a variable control voltage (DC OUT) at an output of the voltage control circuit 40.

Figure 2:
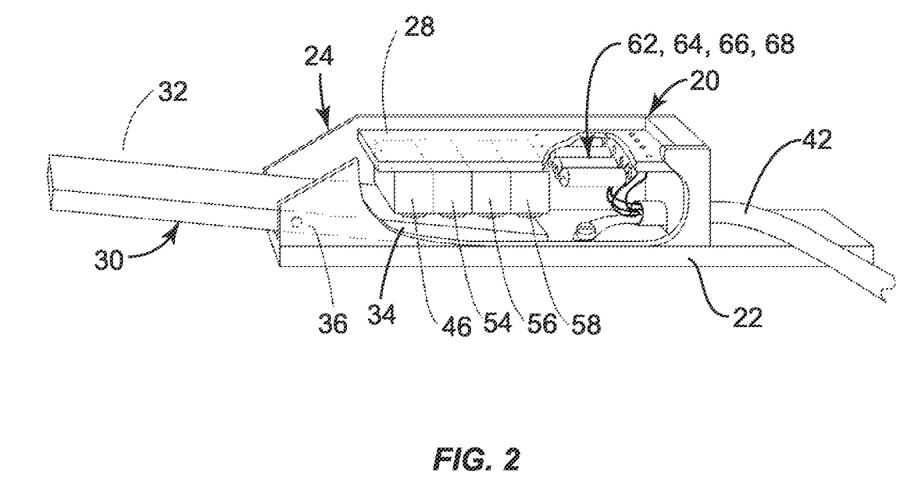
FIG. 2 is a section view of a torch-mounted, welding controller according to the first embodiment.

In one exemplary embodiment, the contactor switch 46 and voltage control switches 54, 56, 58 comprise sub-miniature snap action switches which are mounted to the circuit board 28 (FIG. 2) in the housing 20. Sequential activation of the switches 46, 54, 56, and 58 is achieved by their placement in the housing 20 as shown in FIG. 2. As the control lever 30 is depressed, the activation plungers of the switches 46, 54, 56, 58 are contacted by the inner end of the control lever 30 to sequentially activate the switches 46, 54, 56, and 58.

In operation, the contactor switch 46 is closed first to activate the welding power supply when pressure is applied to the control lever 30. The switches 54, 56 and 58 are closed sequentially in that order as the control lever 30 is further depressed. As switches 54, 56, 58 are activated; the control voltage (DC OUT) output to the welding power supply is taken from successively higher points in the voltage divider network. This arrangement allows for very fine fingertip control of the welding power supply. In one embodiment, the voltage levels correspond to 25% power, 50% power, 75% power and 100% power.

Figure 4:
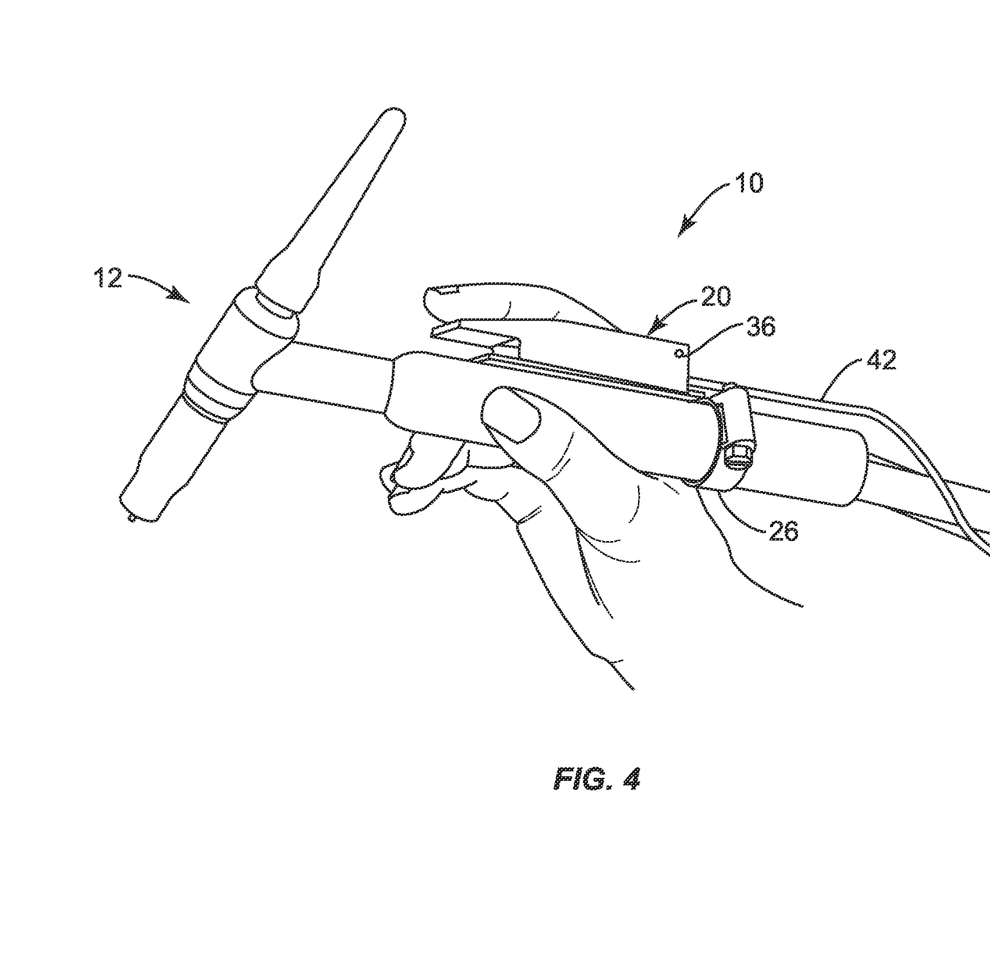
FIG. 4 is a perspective view of a torch-mounted, welding controller according to a second embodiment.
Figure 5:
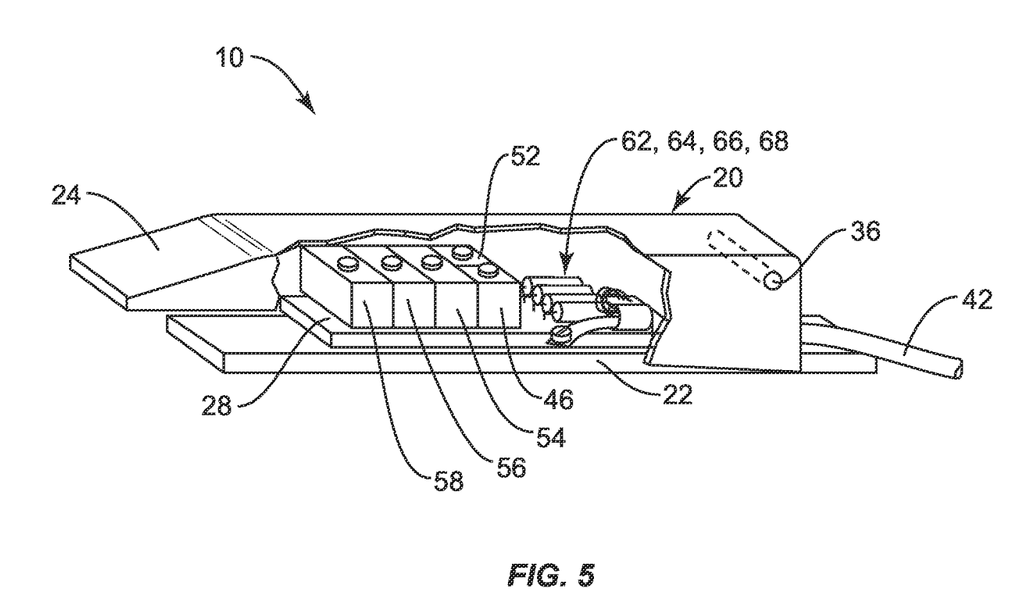
FIG. 5 is a section view of a torch-mounted, welding controller according to the second embodiment.

FIG. 4 illustrates a welding controller 10 according to a second embodiment attached to a typical TIG welding torch 12. In this embodiment, the welding controller 10 comprises a controller housing 20 and a control circuit 40 contained within the housing 20 for controlling the power supplied to the welding torch. The controller housing 20 comprises a base 22 and a cover 24. The controller housing 20 is attached to the torch handle by a clamp 26, although other methods for securing the housing 20 to the torch handle could be used. The cover 24 in this embodiment is pivotally secured to the base 22 by a pivot 36 and functions as the control lever. The cover 24 extends forwardly from the pivot 36 towards the head of the torch 12. The housing 20 is positioned on the torch handle so that the cover 24 lies directly under the user's finger. This arrangement allows the user to hold the torch 12 with a normal grip. The user can exert a varying downward pressure on the cover 24 with an index finger or middle finger to control the power supply to the welding torch 12. As seen in FIG. 5, the cover 24 engages and activates a series of switches in the control circuit 40 to control the power to the welding torch 12.

Figure 6:
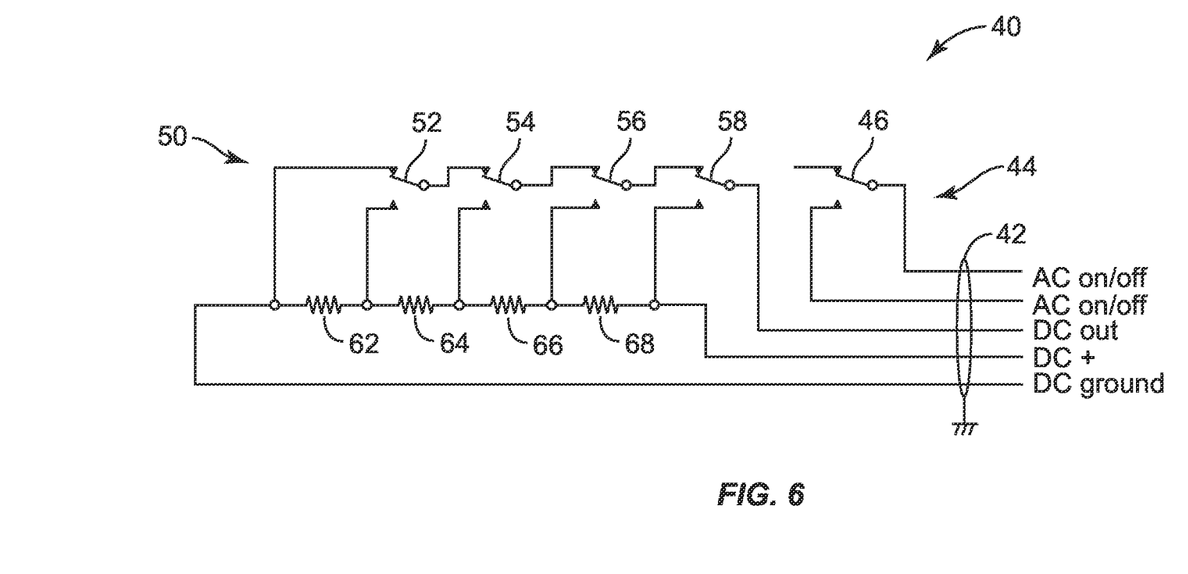
FIG. 6 is a schematic diagram of an exemplary control circuit of the torch-mounted, welding controller according to the second embodiment.

FIG. 6 illustrates an exemplary control circuit 40 according to the second embodiment. The control circuit 40, which is mounted to circuit board 28 (FIG. 5), and connected to the welding power supply by a cable 42. The control circuit 40 comprises a contactor circuit 44 and a voltage control circuit 50. The contactor circuit 44 comprises a contactor switch 46 that completes an AC circuit to activate the welding power supply. The voltage control circuit 50 comprises a plurality of voltage control switches 52, 54, 56, 58 and resistors 62, 64, 66, and 68 arranged as a voltage divider. Compared to the first embodiment, the voltage control circuit 50 includes an additional voltage control switch 52 not present in the first embodiment. The resistors 62, 64, 66, and 68 are connected in series between a nominal +10 volt (DC+) input and ground (GND). Voltage control switch 52 is connected between resistor 62 and ground and voltage control switches 54, 56, 58 are connected between respective pairs of the resistors 62, 64, 66, and 68 to supply a variable control voltage (DC OUT) at an output of the voltage control circuit 40 as the switches 52, 54, 56 and 58 are activated.

In one exemplary embodiment, the switches 46, 52, 54, 56, 58 comprise sub-miniature snap action switches which are mounted to the circuit board 28 in the housing 20. Sequential activation of the switches 46, 52, 54, 56 and 58 is achieved by their placement in the housing 20 as shown in FIG. 5. As the control lever 30 is depressed, the activation plungers of the switches 46, 54, 56, 58 are contacted by the inner surface of cover 24 to sequentially activate the switches 46, 52, 54, 56, and 58.

In operation, the contactor switch 46 and voltage control switch 52 are arranged to be closed at the same time. In other embodiments, the contactor switch 46 could be arranged to close either before or after the voltage control switch 52. The voltage control switch 52 in this embodiment extends the range of the output voltage to 0 volts to accommodate certain welding power supplies that expect the control voltage to go to ground or 0 volts when the contactor switch 44 is open. The switches 54, 56 and 58 are closed sequentially in that order as the cover 24 is further depressed. As switches 52, 54, 56 and 58 are activated; the control voltage (DC OUT) output to the welding power supply is taken from successively higher points in the voltage divider network. This arrangement allows for very fine fingertip control of the welding power supply.

Figure 7:
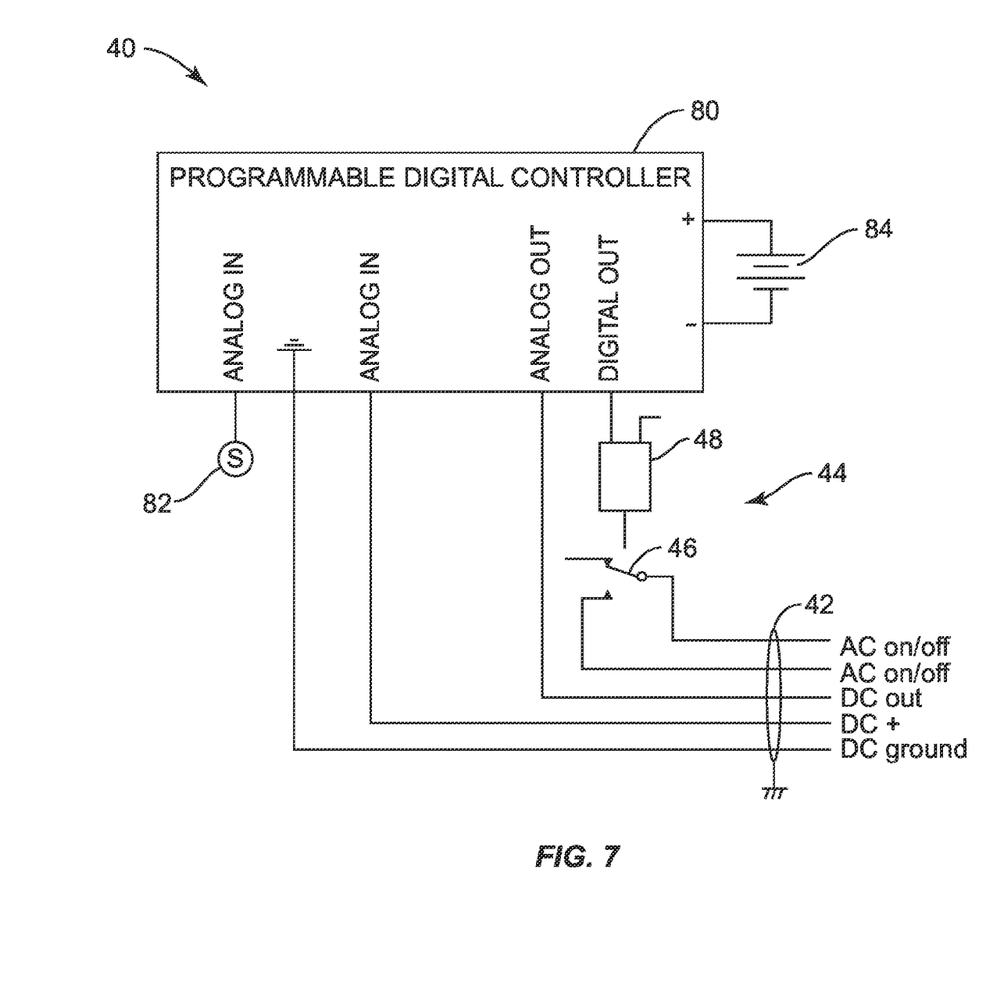
FIG. 7 illustrates a control circuit for a torch-mounted welding controller according to another embodiment.

In the previous embodiments, the switches 46, 52, 54, 56 and 58 are closed mechanically by movement of the control lever 30 or cover 24. FIG. 7 illustrates an alternate embodiment of the control circuit 40. The control circuit 40 in this embodiment comprises a contactor circuit 44, digital controller 80 and sensor 82. The contactor circuit 44 comprises a contactor switch 46 that is operated by a relay 48. The relay 48 is, in turn, activated by the digital controller 80. A battery 84 provides power to the digital controller 80. A +DC reference voltage is supplied by the welding power supply to the digital controller 80. The sensor 82 detects the movement or position of the control lever (e.g., control lever 30 or cover 24) and supplies an analog input signal to the digital controller 80. The sensor 82 may comprise a capacitive, inductive, magnetic, or optical sensor. Sensor 82 could also comprise a pressure transducer or other electro-mechanical transducer. The welding power supply also supplies a reference voltage (+DC) to another analog input of the digital controller 80. Based on a comparison of the analog input signal from the sensor 82 and the +DC reference voltage, the digital controller 80 activates the relay 48 to close the contactor switch 46 and provides a DC control voltage (DC OUT) to the welding power supply via an analog output.

Other implementations of a welding controller 10 based on a switched resistance network are easily imagined, and will not be enumerated here, except to suggest the most obvious, which would substitute some other means of sequential switching for the standard snap-action switches of the present implementation.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A welding controller for a welding torch comprising:
   a control lever configured to mount to a torch handle and movable about a pivot, said control lever arranged such that the lever may be controlled by a user's finger when the torch is held by a user; and
   a voltage control circuit operatively connected to said control lever so as to generate a control voltage that increases with increasing finger pressure applied to said control lever, said voltage control circuit comprising a voltage divider including two or more mechanically activated voltage control switches and two or more series connected resistors that are sequentially activated by the voltage control switches, wherein the voltage control switches have plungers that are contacted by the control lever to mechanically activate the voltage control switches when pressure is applied to the control lever.

2. The welding controller of claim 1 further comprising a contactor circuit for activating a power supply for the welding torch.

3. The welding controller of claim 2 further wherein the contactor circuit comprises a contactor switch activated by the control lever when finger pressure is applied to the control lever.

4. The welding controller of claim 3 wherein the contactor switch is arranged to be activated prior to activation of one of the voltage control switches.

5. The welding controller of claim 3 wherein the contactor switch is arranged to be activated at the same time as a first one of the voltage control switches.

6. The welding controller of claim 3 wherein the contactor switch is arranged to be activated after a first one of the voltage control switches.

7. The welding controller of claim 1 wherein the control lever is biased to an off position and is arranged to pivot towards the torch handle when finger pressure is applied to the control lever by the user.

* * * * *